Sept. 7, 1965    T. C. GREAVES ETAL    3,205,142
CHARGING APPARATUS FOR NUCLEAR REACTORS
Filed Aug. 16, 1962    3 Sheets-Sheet 1

Inventor:
Thomas Cyril Greaves
By Stevens Davis Miller & Mosher
Attorneys

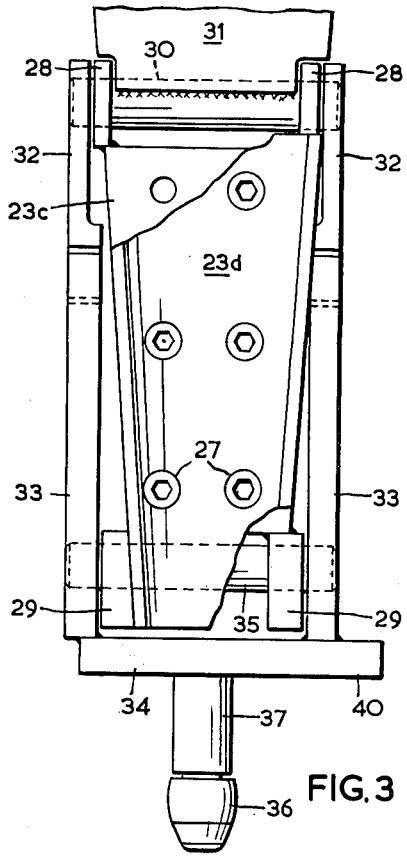
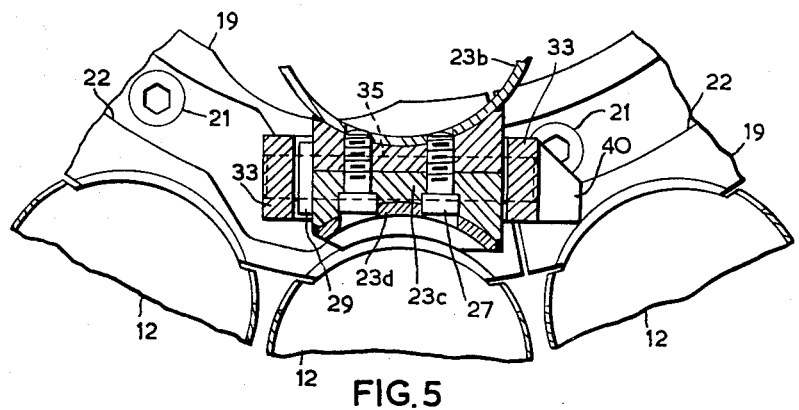

United States Patent Office 3,205,142
Patented Sept. 7, 1965

3,205,142
CHARGING APPARATUS FOR NUCLEAR REACTORS
Thomas Cyril Greaves and Peter Orszak, Whetstone, England, assignors to The English Electric Company Limited, London, England, a British company
Filed Aug. 16, 1962, Ser. No. 217,399
Claims priority, application Great Britain, Sept. 6, 1961, 31,964/61
2 Claims. (Cl. 176—30)

This invention relates to apparatus for providing access to a group of fuel element channels through an access duct in the biological shield of a nuclear reactor.

According to the invention, such apparatus includes, in combination, a rotatable charge chute adapted to be mounted in the duct and an assembly of fixed fuel element guide tubes positioned adjacent the servicing ends of the fuel channels, each guide tube being aligned at one end with one of the fuel channels within the group, the other ends of the guide tubes being arranged on two pitch circles concentric with the axis of the charge chute, and a movable flap being mounted in the charge chute for angular movement across the charge chute between two positions, whereby in one position to provide access to guide tubes on one of the pitch circles and in the other position to provide access to guide tubes on the other pitch circle.

According to another feature of the invention, the apparatus includes actuating means for automatically causing appropriate angular movement of the movable flap in response to rotational movement of the charge chute.

One apparatus in a preferred form according to the invention, for providing access to a group of fuel element channels through an access duct in the biological shield of a gas-cooled, graphite-moderated nuclear reactor, will now be described by way of example and with reference to the accompanying drawings, of which:

FIG. 3 is an elevation of part of the charge chute taken in the direction of the arrow III in FIG. 2;

FIG. 5 is an enlarged view of part of FIG. 1 showing part of the charge chute.

Figure 1:
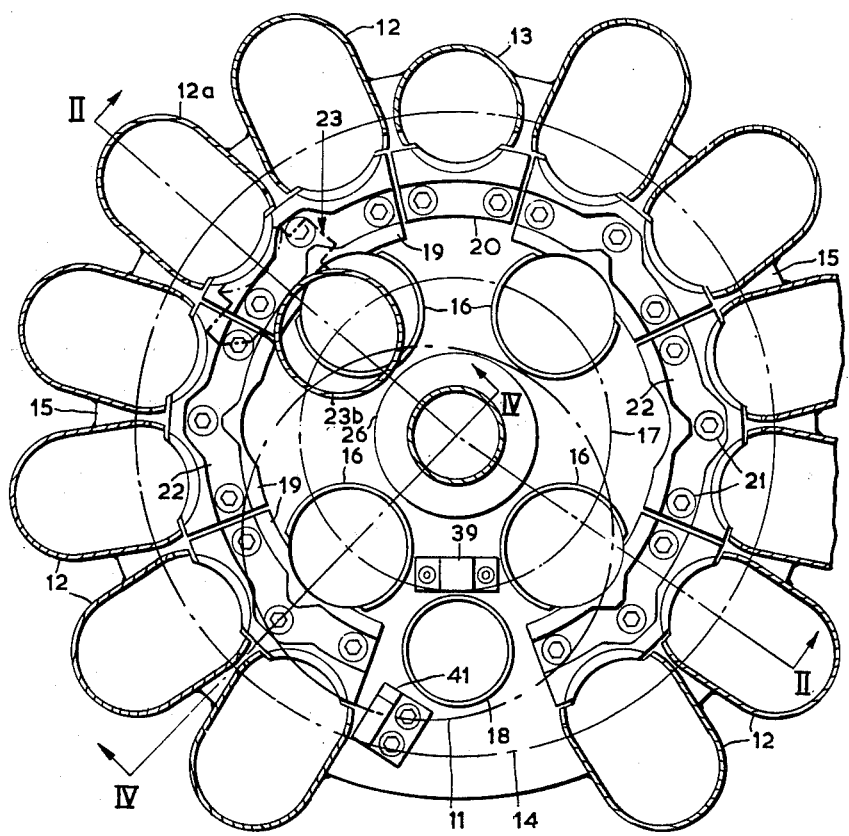
FIG. 1 is a sectional plan view taken on the line I—I of FIG. 2 of a guide tube assembly with the charge chute in one position.
Figure 2:
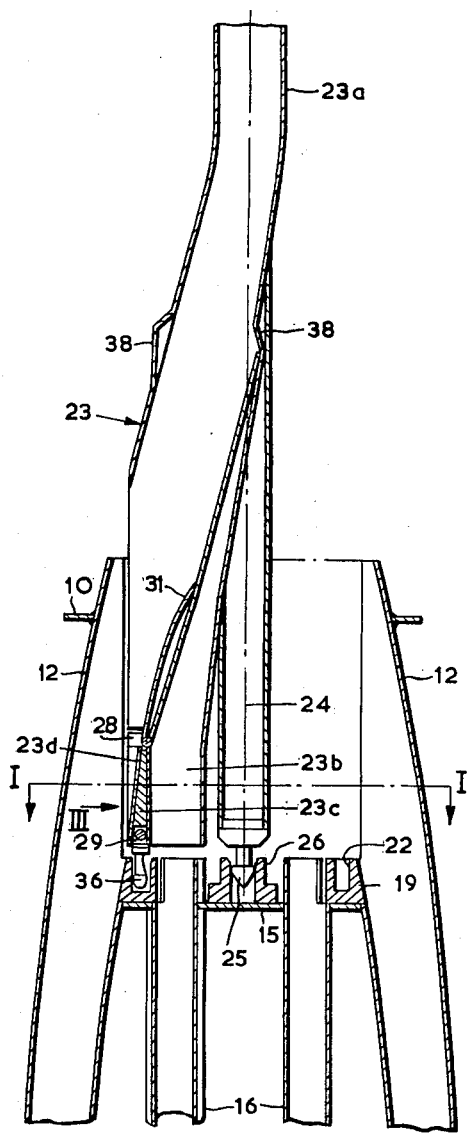
FIG. 2 is a sectional elevation taken on the line II—II of FIG. 1.

Referring to the drawings, the reactor pressure vessel has a number of standpipes, each fitted at its lower end with brackets from which is suspended a plate, shown at 10 in FIG. 2, which supports the guide-tube assembly shown in FIGS. 1 and 2. The standpipe and brackets are not shown in the drawings, but the position of the standpipe over the guide-tube assembly is indicated at 11 in FIG. 1.

To the plate 10 are secured the upper portions of twelve outer guide tubes 12, which are arranged, together with that of a specimen tube 13, on a pitch circle 14. A second plate 15 is welded to the tubes 12 and carries four inner guide tubes 16 arranged on a pitch circle 17 concentric with the circle 14. Each of the sixteen guide tubes leads downwards to a fuel channel in the reactor core (not shown). The fuel channels, with the lower ends of the corresponding guide tubes, are arranged on a square lattice, the guide tubes being shaped so as to effect a gradual transition from the arrangement of the upper ends of the tubes to that of the lower. A guide tube 18 for a control rod is also fitted in the plate 15.

Cam segments 19 and 20 are secured by screws 21 to the plate 15 between the inner and the outer guide tubes, each cam segment having a cam track 22 concentric with the pitch circles 14 and 17. On those radials on which lie the centres of the outer guide tubes 12 and the specimen tube 13 (for instance the line II—II), the cam track is disposed at one radial distance from the centre of the plate 15; and on the other radials (such as the line IV—IV) on which lie the centres of the inner guide tubes 16, the cam track is disposed at another and greater radial distance from the centre.

Figure 4:
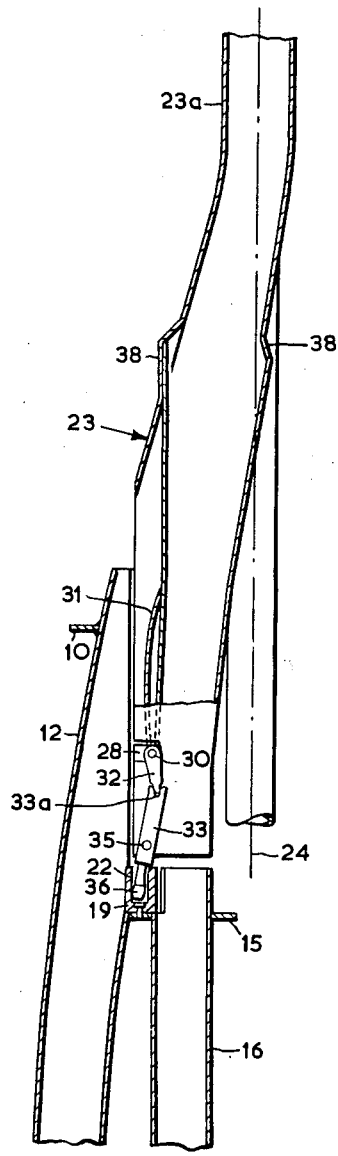
FIG. 4 is a part sectional elevation taken on the line IV—IV of FIG. 1 but showing the charge chute in another position.

The guide tube assembly is served by a rigid charge chute, generally indicated at 23 and shown in section in FIG. 2 and in outside elevation in FIG. 4. The charge chute is arranged for rotation (by means not shown) about the central axis 24 of the guide-tube assembly, the charge chute having a lower bearing journal member 25 resting in a bearing housing 26 secured to the centre of the plate 15. The upper part 23a of the charge chute projects through the standpipe 11.

The charge chute is formed at its lower end with an inner exit portion 23b of circular cross-section, to which is attached a support member 23c which consists of two plates bolted together by bolts 27. When the charge chute is in position, the centre of the inner exit portion 23b lies on the pitch circle 17. An outer exit portion 23d is secured by the bolts 27 to the support member 23c, to which are also secured two upper pivot bearings 28 and two lower pivot bearings 29. This assembly is shown more clearly in FIG. 3, in which the outer exit portion 23d is shown partly cut away. A shaft 30, free to pivot in the bearings 28, has secured to it a flap 31 which extends up the charge chute as shown in FIG. 2; in addition an arm 32 is attached to each end of the shaft 30. The lower end of each arm 32 has a cycloidal shape to engage a slot 33a in another arm 33. The arms 33 are joined at their lower ends by a cross-member 34 and by a shaft 35 which is free to pivot in the bearings 29. The roller 36 is free to rotate on an arm 37 extending from the cross-member 34; and when the charge chute is in position on the guide-tube assembly, as shown in the drawings, the roller 36 engages the cam track 22 so as to act as a cam follower.

In operation, rotary movement of the arms 33 in one direction causes the arms 32 to rotate the shaft 30 in the other direction so as to swing the flap 31 across the charge chute. When the charge chute is in the position shown in FIGS. 1 and 2, i.e. opposite one of the outer guide tubes 12 (in which position the flap is to the right in FIG. 2), a free passage is created for fuel elements to be loaded into or unloaded from the outer guide tube.

If the charge chute is now moved so as to be in a position to serve an inner guide tube, as in FIG. 4, the cam track moves the roller 36 outwards, so that the flap 31 is moved across the charge chute to create a free passage down the charge chute through its inner exit portion 23b to the inner guide tube.

Since the cam track is at one radius opposite all the outer guide tubes and at another radius opposite all the inner guide tubes, the plate 31 is automatically moved to the right (in FIG. 2) to serve the former and to the left to serve the latter.

Two recesses 38 are provided in the walls of the charge chute to allow the upper end of the flap 31 some overtravel. This is to compensate for magnification, at that end, of errors in the distance of travel of the flap due to manufacturing tolerances, wear and other causes.

A stop 39 is fitted on the plate 15, to engage the outer exit portion 23b of the charge chute and so prevent the charge chute overlapping the control-rod guide tube 18.

The charge chute described may normally be in position on the guide tube assembly, in which case it may be readily removed for maintenance or repair; alternatively the charge chute may be lowered into position only when required for use. For removing or lowering the charge chute, the latter is in position for serving the guide tube shown in FIG. 1 at 12a; to ensure that the roller 36 enters the cam track when being lowered into position, there is provided on the cross-member 34 a lug 40, which engages a guide post 41 fixed to the plate 15.

Although in the example described sixteen guide tubes are provided, there may be any suitable number. There may be one or more guide tubes on the inner pitch circle 17.

What we claim as our invention and desire to secure by Letters Patent is:

1. In a nuclear reactor comprising a reactor core, means defining fuel channels in said reactor core, means defining an open end of each said fuel channel for entry to the channel and exit therefrom of fuel elements, a biological shield surrounding said core, and means defining an access duct through said biological shield to give access to said fuel channels; a charging apparatus comprising a rotatable charge chute, means for mounting said charge chute in said access duct, an assembly of fixed fuel-element guide tubes positioned between said access duct and the reactor core and adjacent the said open ends of the fuel channels, means defining a first open end of each guide tube adjacent a said open end of a fuel channel, means defining second open end of each guide tube at the opposite end thereof from said first open end, said second open ends of the guide tubes being arranged on two pitch circles concentric with the axis of rotation of the charge chute, a movable flap mounted transversely in the charge chute, means for moving the flap about a transverse axis between two positions defining two separate alternative paths for fuel elements within the charge chute between said flap and said guide tubes, and first and second duct means in the charge chute between said flap and said guide tubes on one pitch circle and said guide tubes on the other pitch circle respectively for guiding fuel elements into said guide tubes on the corresponding pitch circle according to the position of said flap.

2. Charging apparatus according to claim 1, having fixed cam means on the guide tube assembly co-axial with the axis of rotation of the charge chute, a cam follower on said charge chute engaging said cam means, link means connecting said cam follower and said flap, and means defining radial indentations in the cam means so as to give the cam follower radial movement on rotation of the charge chute.

References Cited by the Examiner

UNITED STATES PATENTS 2,984,612  5/61  Hackney et al. _____ 176—30

FOREIGN PATENTS 1,149,949  7/60  France.
1,229,800  9/60  France.

CARL D. QUARFORTH, *Primary Examiner.*

REUBEN EPSTEIN, *Examiner.*